(12) United States Patent
Kern

(10) Patent No.: US 10,357,842 B2
(45) Date of Patent: Jul. 23, 2019

(54) METHOD FOR WELDING NONFERROUS METAL SHEETS

(71) Applicant: ULTRAFLOTE L.L.C., Houston, TX (US)

(72) Inventor: Ronald Carl Kern, Katy, TX (US)

(73) Assignee: ULTRAFLOTE L.L.C., Houston, TX (US)

( * ) Notice: Subject to any disclaimer, the term of this patent is extended or adjusted under 35 U.S.C. 154(b) by 795 days.

(21) Appl. No.: 15/019,955

(22) Filed: Feb. 9, 2016

(65) Prior Publication Data

US 2016/0243637 A1 Aug. 25, 2016

Related U.S. Application Data

(60) Provisional application No. 62/115,116, filed on Feb. 11, 2015.

(51) Int. Cl.
| | |
|---|---|
| B23K 9/00 | (2006.01) |
| B23K 9/23 | (2006.01) |
| B23K 9/173 | (2006.01) |
| B23K 103/10 | (2006.01) |

(52) U.S. Cl.
CPC ............ B23K 9/0035 (2013.01); B23K 9/173 (2013.01); B23K 9/23 (2013.01); B23K 2103/10 (2018.08)

(58) Field of Classification Search
CPC ........ B23K 9/0035; B23K 9/23; B23K 9/173; B23K 2103/10; B23K 9/00; B23K 9/0026; B23K 9/232; B23K 2103/08
See application file for complete search history.

(56) References Cited

U.S. PATENT DOCUMENTS 9,095,932 B2 * 8/2015 Miller .................... B23K 31/02

* cited by examiner

*Primary Examiner* — David J Walczak
(74) *Attorney, Agent, or Firm* — Adolph Locklar

(57) ABSTRACT

A method for welding nonferrous metal sheets, particularly thin aluminum sheets, using commercially available welding equipment and procedures resulting in reduced cost and faster welding speed without the need for high clamping force, specialized equipment or training, or specialized sheet surface and edge treatments, involving positioning the edges of the thin nonferrous sheets between heavier nonferrous metal bars or sheets in a manner that allows a weld bead or molten weld pool to be formed that incorporates all three layers of the metal, the posterior welding material member, the thin sheet sandwiched between, and the anterior welding material member forming the "sandwich". The anterior and posterior welding material members and the thin sheets then are welded together with the thin sheets captured between them and with the edges forming a weld "nugget" between the welding material members creating an impermeable airtight seam joining the sheets together.

20 Claims, 3 Drawing Sheets

METHOD FOR WELDING NONFERROUS METAL SHEETS

CROSS-REFERENCE TO RELATED APPLICATIONS

This application claims the benefit of U.S. Provisional Application 62/115,116 filed on Feb. 11, 2015.

PATENT CITATIONS

| | | |
|---|---|---|
| U.S. Pat. No. 6,054,668 A | April 2000 | VanOtteren et al |
| U.S. Pat. No. 6,281,466 B1 | August 2001 | VanOtteren et al |
| U.S. Pat. No. 6,791,056 B2 | September 2004 | VanOtteren et al |
| US20100044349 A1 | March 2010 | Yoo |

BACKGROUND OF THE INVENTION

1. Field of the Invention

This invention relates to a method for the welding of non-ferrous metal sheets. More particularly, the invention concerns a method for the welding of thin sheets of nonferrous metal, such as aluminum, using commercially available welding equipment and procedures and resulting in reduced welding time and costs.

2. Description of Related Art

While the welding of nonferrous metals, such as aluminum and aluminum alloys, has been commercially practiced for over sixty years, the welding of very thin nonferrous metal sheets is a difficult and demanding process, which requires highly specialized training and equipment, making such welding inefficient, expensive, and not commercially viable in most situations. The difficulty in welding very thin sheets of nonferrous metals, like aluminum, stems from their unique physical properties, which differ greatly from those of ferrous metals, such as steel. Thus, it is fitting that technologies for joining steel sheets have developed; whereas, the development of technologies for joining aluminum sheets has progressed much more slowly.

When attempting to weld aluminum sheets with a thickness of less than 0.050 inches several technical problems arise due to the properties of the metal. As soon as aluminum is exposed to open air, an oxide layer instantly forms on its surface. This layer protects the aluminum from corrosion and has very high melting point of approximately 3,600° F., several thousand degrees greater than the melting point of aluminum and aluminum alloys, which normally melt in the range of 1,100° F. to 1,250° F. Additionally, aluminum's high thermal conductivity causes heat to rapidly dissipate during welding, which makes it very difficult to obtain enough heat to join aluminum sheets. As one attempts to melt the oxide layer surrounding a thin aluminum sheet, the high temperature required coupled with the high conductivity of aluminum causes the thin underlying aluminum core to melt almost immediately resulting in splattering of liquid aluminum and effectively destroying the sheet at the location of the weld.

At the present time, only spot welding, spot seam welding, and projection welding can be used to weld very thin sheets of nonferrous metals, especially aluminum. Each method requires specialized and expensive equipment and the ability to apply high clamping forces to electrodes on both sides of the sheet or sheets. Each method also requires extensive and time consuming procedures for removal of the natural oxide layers that form on aluminum. Because of the significant expense involved, these methods have been commercially adopted only where product requirements do not permit substitution with more economical materials or processes.

The welding of thicker nonferrous metals, especially aluminum and aluminum alloys, can be accomplished by several recognized methods but the most commonly used are Tungsten Inert Gas ('TIG'), also known as Gas Tungsten Arc Welding ('GTAW'), and Metal Inert Gas ('MIG'), which is also known as Gas Metal Arc Welding ('GMAW').

While TIG welding can be used on thinner aluminum than MIG, it is a much slower process and requires more highly trained and skilled operators as there are many variables that must be manually and simultaneously maintained to achieve satisfactory results. TIG welding is too slow for reasonable production applications and leads to increased labor costs as it requires higher levels of training of operators.

MIG welding is the preferred choice for most commercial applications due to the semi-automatic nature of the process which increases welding speed and dramatically reduces required skill levels and operator training. However, it is generally known to those of skill in the art that MIG welding of aluminum sheets requires sheets at least 0.080 inches thick. Even the latest Pulsed MIG equipment available today, which can reduce heat input into the weld, is limited to welding of sheets with a minimum thickness of at least 0.050 inches and with greatly reduced welding speeds.

The most commonly accepted method for welding thin nonferrous sheets is to increase the thickness of the sheeting until it is thick enough to allow "traditional" edge welding of the sheet edge to a heavier member or even to another sheet. In realistic terms, traditional MIG welding procedures would require nonferrous sheet thicknesses of at least 0.080 inches. TIG welding calls for a minimum thicknesses of 0.050 inches or perhaps even only 0.040 inches; however, TIG welding is a slower process and requires highly skilled welders to control the heat into the sheets to avoid "melt-back" and destruction of the sheet edges. With additional sheet thickness, slower welding speed, and expensive, skilled operators, conventional methods of welding thin nonferrous sheets result in considerable costs, which can be significantly reduced by the present invention.

SUMMARY OF THE INVENTION

It is an object of the present invention to provide a method of welding very thin sheets of nonferrous metal together or to other metal objects.

Another object of the invention is to provide a method of welding very thin nonferrous metal sheets allowing for increased welding speed and reduced costs without the need for specialized equipment, training, or pretreatment to remove oxidation.

An additional object of the invention is to provide a method of welding very thin nonferrous metal sheets which does not require very high clamping forces as normally is needed in conventional spot or projection welding.

A further object of the invention is to provide a method of welding very thin nonferrous metal sheets which can be completed while the operator and equipment remain entirely on one side of the sheets, improving on conventional spot or projection welding methods, which require electrodes on both sides of the sheets.

Another object of the invention is to provide a method of welding very thin nonferrous metal sheets to form a permanent impermeable airtight barrier, covering a very large surface area, thousands of square feet or greater, that can prevent the escape of vapor or gases.

Yet another object of the invention is to provide a method of welding very thin nonferrous metal sheets allowing for decreased metal usage and reduced materials costs as thinner sheets are used. Although the method does require additional welding material members along the edges, they are relatively narrow and light weight compared to the additional weight of a thicker sheet, which would be required for conventional welding.

This and other objects are achieved in accordance with an embodiment of the invention wherein the edges of the thin sheet or sheets of aluminum are firmly clamped between welding material members, such as beams or even thicker narrow sheets, in a manner that allows a weld bead or molten weld pool to be formed that incorporates all three layers of metal, the posterior welding material member, the thin sheet or sheets sandwiched between, and the anterior welding material member forming the "sandwich" or "stack". The edges of the anterior and posterior welding material members and the sheet are then welded together with the sheet captured between them.

According to one embodiment, the method disclosed herein can be applied in series with many large nonferrous sheets welded together forming a large impermeable airtight barrier covering areas of thousands of square feet or more. Such a method would be useful for assembly of large structures designed to prevent escape of vapor, such as an oil tank floating roof. The method can be carried out in a semi-automated process to optimize welding speed using conventional equipment, such as a tractor guided GMAW system, without the need for highly skilled operators. The ability to use thinner sheets of aluminum than conventional methods results in significant cost savings as a smaller amount of raw materials is used. Such savings are magnified in the case of large surfaces. This is best illustrated with an example.

Using a 100 foot diameter planar surface as an example, 0.040 inch thick aluminum sheeting would weigh approximately 4,480 pounds. If 0.050 inch thick sheeting is used, to increase field welding speed, it would weigh approximately 5,600 pounds. The same surface with 0.023 inch thick aluminum sheeting would only weigh approximately 2,575 pounds, a 1,905 pound (or 3,025 pound) savings. The edge extrusions used in accordance with an embodiment of the invention would weigh approximately 712 pounds, still yielding a 1,193 pound (or 2,313 pound) savings. Aluminum prices vary but applying a fair cost of $2.00/pound, yields $2,386.00 (or $4,626) in savings. The edge extrusions also provide additional "beam" strength which makes the surface much stronger as well.

In addition to raw material cost savings, the method allows for much faster welding speeds which can add up to even greater savings. Also, since the method allows the use of semi-automated equipment, the duty cycle of each weld, the amount of time that the arc weld is actually being made versus the total time, can be much higher allowing less overall time for completion.

The present invention is applicable to nonferrous metal sheets of virtually any thickness, including very thin sheet thicknesses (less than 0.08 inches) normally considered to be not weldable using traditional processes. The above and other objects, features and advantages of the present invention will become clear from the following particular description, taken in conjunction with the accompanying drawings which provide a preferred embodiment of the invention as an example.

BRIEF DESCRIPTION OF THE DRAWINGS

In the drawings wherein like reference numerals denote similar components throughout the views.

DETAILED DESCRIPTION OF PREFERRED EMBODIMENTS

In accordance with preferred embodiments of the invention referring to FIGS. 1, 2, 3, 4, 5, 6, and 7, two relatively heavier welding material members, including extrusions, beams, bars, plates, or even thicker sheets, form a "stack" or "sandwich" on either side of a thin nonferrous sheet or sheets. According to these embodiments, the welding material members then act as "heat sinks" to allow the concentrated heat of the electric arc welding process without the "melt-back" and edge destruction that occurs with very thin sheets. This method will work with more than one thin sheet layer in the "sandwich". The precise details of the joint geometry and clamping details can be varied considerably without changing this base concept. This allows the heavier welding material members to have other uses in the product such as for structural support, like beams. The clamping forces need only to be sufficient enough to promote good thermal conductivity without requiring the significantly higher clamping forces required by "spot" welding and similar processes. This allows for use of much simpler and less expensive clamping methods compared to "spot" welding and similar processes while still producing an impermeable airtight seam.

Figure 1:
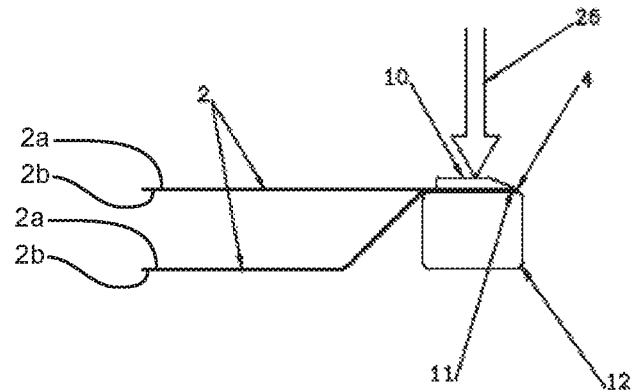
FIG. 1 is a side view of the initial arrangement of components including one arrangement of manual hold-downs according to an embodiment of the invention.
Figure 2:
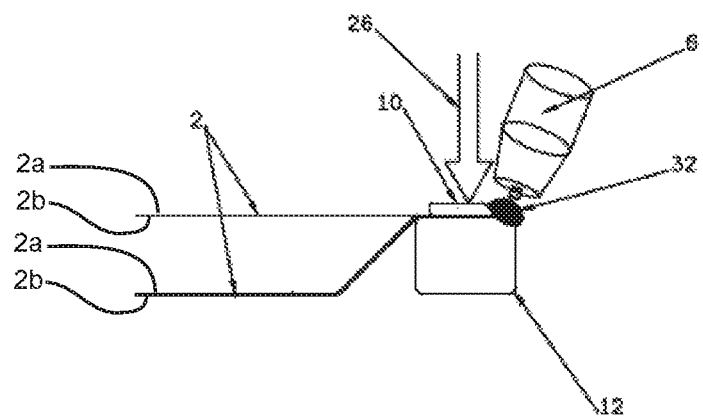
FIG. 2 is a side view of the arrangement of components during welding according to an embodiment of the invention.
Figure 3:
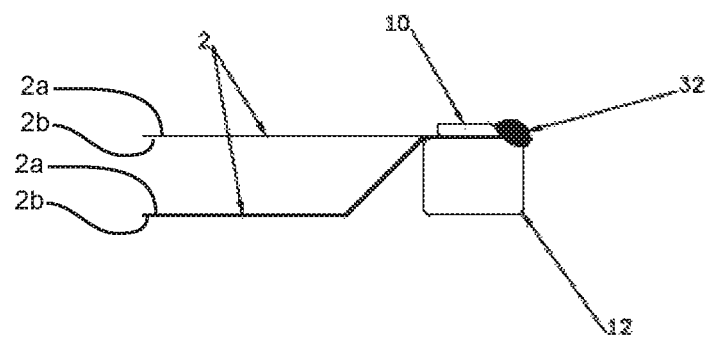
FIG. 3 is a side view of the arrangement of components after the edges of the sheets and posterior beams are welded together according to an embodiment of the invention.
Figure 4:
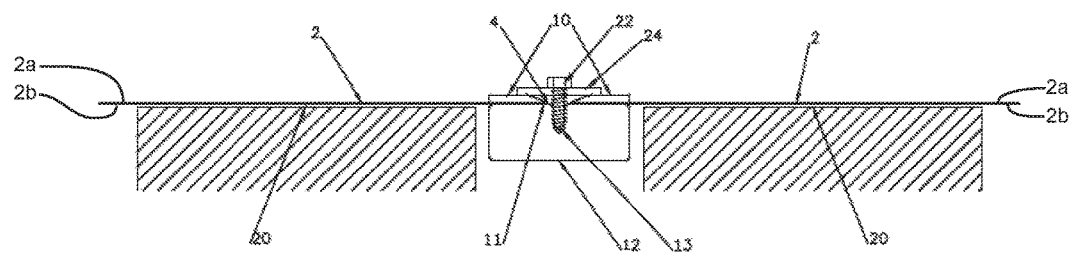
FIG. 4 is a side view of the initial arrangement of components including one arrangement of temporary hold-downs according to an embodiment of the invention.

Referring to FIGS. 1, 2, and 3, there is shown the method of welding nonferrous metal sheets according to an embodiment of the present invention. Two thin nonferrous sheets 2, each including an anterior surface 2a and a posterior surface 2b, are supplied with edges 4 touching. The edges 4 of the sheets 2 are sandwiched between the anterior welding material member 10 and a posterior beam 12. Manual clamping force 26 is applied to the anterior welding material member 10. The clamping force 26 needs only to be sufficient enough to promote good thermal conductivity through the "stack" or "sandwich". While the clamping force 26 is applied, a MIG torch 6 is used to weld 32 the inner edge 11 of each anterior welding material member 10 along with the edges 4 of the sheets 2 below to the posterior beam 12. This forms an impermeable seam joining the nonferrous sheets 4 sandwiched between the anterior welding material member 10 and posterior beam 12.

Referring to FIGS. 4, 5, 6, and 7, there is shown the method of welding nonferrous metal sheets according to another embodiment of the present invention. Two thin nonferrous sheets 2, each including an anterior surface 2a and a posterior surface 2b, are supplied with edges 4 close together, 0.375 inches apart according to one embodiment. The sheets 2 are supported by temporary supports 20, which are later removed after welding is complete. The edges 4 of the sheets 2 are sandwiched between separate anterior welding material members 10 and a posterior beam 12. The clamping forces need only to be sufficient enough to promote good thermal conductivity through the "stack" or "sandwich".

As nonferrous metal sheets can be very wide, commonly produced in widths over 100 inches, the clamping of the extrusions cannot be done with traditional "C-clamps" or similar means when welding wide sheets. Thus, a preferred embodiment incorporates a screw groove in the posterior welding material member, which can be used with screws or similar temporary fasteners to clamp the extrusions firmly together. These temporary fasteners can be removed just prior to welding, or according to a preferred embodiment, the "stack" could be tack welded together to allow the fasteners to be removed well before the final welding process.

Each inner edge 11 of the anterior welding material members 10 is held in place a short distance away from the edge 4 of the sheet 2 below it. The welding material members 10 are clamped in place by screws 22 installed through a washer or bar 24 through a screw groove 13 in the posterior beam 12. The screws 22 and washers 24 are removed after tacking. The screws 22 keep the anterior welding material members 10 and sheets 2 in place while allowing a crew to continue to layout more sheets and framework while a welder welds the seams simultaneously. The screws 22 can be loosened/tightened to allow for adjustment of the fit of the sheets 2 on the framework.

Figure 5:
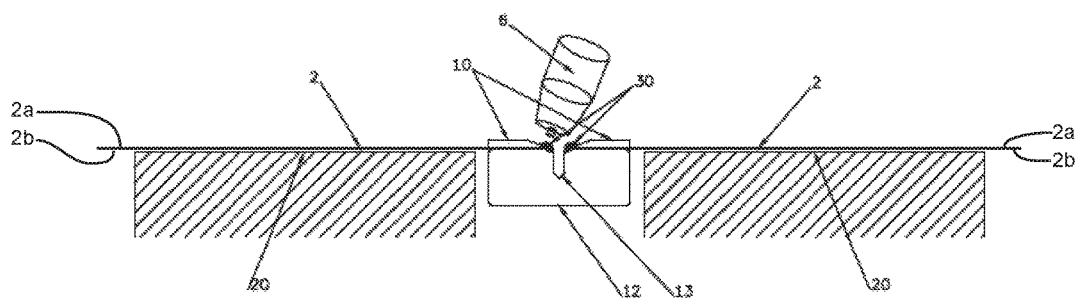
FIG. 5 is a side view of the arrangement of components during tacking according to an embodiment of the invention.

In accordance with this embodiment referring to FIG. 5, A MIG torch 6 is used to tack 30 the inner edge 11 of each anterior welding material member 10 along with the edge 4 of the sheet 2 below it to the posterior beam 12. Following tacking of both edges, the screws 22 and washers 24 are removed.

Figure 6:
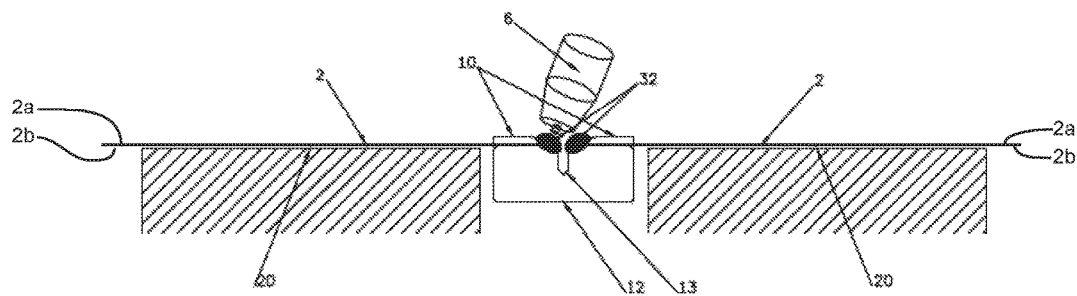
FIG. 6 is a side view of the arrangement of components during welding according to an embodiment of the invention.

In accordance with this embodiment referring to FIG. 6, a MIG torch 6 is used to weld 32 the inner edge 11 of each welding material member 10 along with the edge 4 of the sheet 2 below to the posterior beam 12. This weld 32 uses a smaller bead than other conventional methods of welding thin nonferrous sheets, which allows for faster welding and less shrinkage. The tacks 30 also help to minimize warping due to shrinkage.

Figure 7:
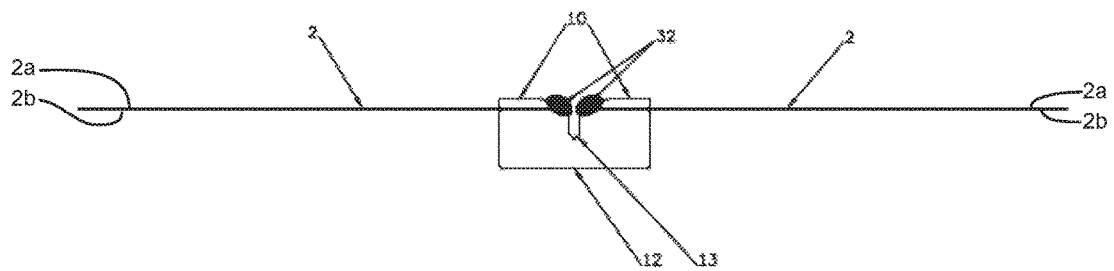
FIG. 7 is a side view of the arrangement of components after the edges of the sheets and posterior beams are welded together according to an embodiment of the invention.

In accordance with this embodiment referring to FIG. 7, the temporary supports 20 are removed showing the finished welded seam.

In accordance with another embodiment, the method disclosed herein can be applied in series with many large nonferrous sheets welded together forming a large impermeable airtight surface covering areas of thousands of square feet or more. This method can be carried out in a semi-automated process to optimize welding speed using conventional equipment, such as a tractor guided GMAW system, without the need for highly skilled operators.

Other embodiments of the present invention can be employed to achieve a similar welding result. 'T' grooves for special fasteners that can be turned in the groove to engage the underside of the 'T' groove can be used for clamping of the sheets during welding. Also extruded "ribs" can be added which extend high enough to be engaged by specialized temporary tooling to clamp the layers together. These "ribs" could then be mechanically removed prior to welding, or they could be melted by and incorporated into the welding operation itself. While our preferred embodiment welds each thin sheet on each side of the seam, allowing for greater welding speed, the sheets can be welded together with one, larger weld. They can also be clamped and welded together separately allowing a clamping engagement device to engage the extrusions in other ways but requiring two welds, which could be done in the same or in separate weld operations.

While there have been shown and described fundamental novel features of the invention as applied to preferred embodiments thereof, it will be understood that various omissions and substitutions and changes in the form and details of the methods described and elements illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed embodiment of the invention may be incorporated in any other disclosed, described, or suggested form or embodiment as a general matter of design choice.

The invention claimed is:

1. A method of welding nonferrous metal sheets, comprising:
   providing at least one nonferrous metal sheet, each of the at least one nonferrous metal sheet having an anterior surface and a posterior surface;
   providing at least two welding material members, each of the at least two welding material members being constructed of an electrically and thermally conductive metallic material capable of bonding in weld-forming relation with the at least one nonferrous metal sheet;
   positioning at least one of the at least two welding material members in contact with the anterior surface of the at least one nonferrous metal sheet;
   positioning at least one of the at least two welding material members in contact with the posterior surface of the at least one nonferrous metal sheet;
   applying an electric arc across the at least two welding material members such that the heat from the electric arc melts the at least two welding members and the at least one nonferrous metal sheet forming a weld seam, which incorporates the at least one nonferrous metal sheet and the at least two welding members.

2. A method according to claim 1, wherein the weld seams are joined continuously forming a impermeable airtight barrier.

3. A method according to claim 1, wherein the at least one nonferrous metal sheet is less than 0.08 inches thick, and the weld seams are joined continuously forming a impermeable airtight barrier.

4. A method according to claim 1, wherein the electric arc is applied by gas metal arc welding in two applications, a first application to tack the at least two welding members to the at least one nonferrous metal sheet, and a second application to form the weld seam.

5. A method according to claim 1, wherein the electric arc is applied by gas metal arc welding in two applications, a first application to tack the at least two welding members to the at least one nonferrous metal sheet, and a second application to form the weld seam, where the weld seams are joined continuously forming a impermeable airtight barrier.

6. A method according to claim 1, wherein the at least one nonferrous metal sheet is less than 0.08 inches thick, the electric arc is applied by gas metal arc welding in two applications, a first application to tack the at least two welding members to the at least one nonferrous metal sheet, and a second application of current to form the weld seam, where the weld seams are joined continuously forming a impermeable airtight barrier.

7. A method of welding aluminum sheets, comprising:
providing at least one aluminum sheet, each of the at least one aluminum sheet having an anterior surface and a posterior surface;
providing at least two welding material members, each of the at least two welding material members being constructed of an electrically and thermally conductive metallic material capable of bonding in weld-forming relation with the at least one aluminum sheet;
positioning at least one of the at least two welding material members anterior to a planar position of and in contact with the at least one aluminum sheet;
positioning at least one of the at least two welding material members posterior to the planar position of and in contact with the at least one aluminum sheet;
applying an electric arc across the at least two welding material members such that the heat from the electric arc melts the at least two welding members and the at least one aluminum sheet forming weld seam, which incorporates the at least one aluminum sheet and the at least two welding members.

8. A method according to claim 7, wherein the weld seams are joined continuously forming a impermeable airtight barrier.

9. A method according to claim 7, wherein the at least one aluminum sheet is less than 0.08 inches thick, and the weld seams are joined continuously forming a impermeable airtight barrier.

10. A method according to claim 7, wherein the electric arc is applied by gas metal arc welding in two applications, a first application to tack the at least two welding members to the at least one aluminum sheet, and a second application to form the weld seam.

11. A method according to claim 7, wherein the electric arc is applied by gas metal arc welding in two applications, a first application to tack the at least two welding members to the at least one aluminum sheet, and a second application to form the weld seam, where the weld seams are joined continuously forming a impermeable airtight barrier.

12. A method according to claim 7, wherein the at least one aluminum sheet is less than 0.08 inches thick, the electric arc is applied by gas metal arc welding in two applications, a first application to tack the at least two welding members to the at least one aluminum sheet, and a second application of current to form the weld seam, where the weld seams are joined continuously forming a impermeable airtight barrier.

13. A method of welding nonferrous metal sheets to form a barrier capable of covering very large surface areas comprising:
providing a plurality of nonferrous metal sheets having an anterior surface and a posterior surface, and each of the plurality of nonferrous metal sheets having at least one welding edge;
providing a structure of beams comprised of a plurality of beams, each of the plurality of beams being constructed of an electrically and thermally conductive metallic material capable of bonding in weld-forming relation with the plurality of nonferrous sheets;
providing a plurality of welding material members, each of the plurality of welding material members being constructed of an electrically and thermally conductive metallic material capable of bonding in weld-forming relation with the plurality of nonferrous sheets;
positioning the structure of beams so that the plurality of beams are in contact with the posterior surface of the plurality of nonferrous metal sheets; positioning each of the plurality of nonferrous metal sheets to be in close proximity to another of the plurality of nonferrous metal sheets and so that each of the at least one welding edges of each of the plurality of nonmetal ferrous sheets is in contact with at least one beam of the plurality of beams and at least one welding member of the plurality of welding members;
positioning each of the plurality of welding material members to be in contact with the anterior surface of the plurality of nonferrous metal sheets;
applying an electric arc across each of the plurality of welding material members such that the heat from the electric arc melts each of the plurality of welding members, each of the plurality of nonferrous metal sheets whose welding edges are in contact with each of the plurality of welding members, and each of the plurality of beams in contact with the welding edges of the nonferrous metal sheets, forming a weld seam, which incorporates each of the plurality of welding members, each of the plurality of nonferrous metal sheets whose welding edges are in contact with each of the plurality of welding members, and each of the plurality of beams in contact with the welding edges of the nonferrous metal sheets.

14. A method according to claim 13, wherein the nonferrous metal sheets are aluminum sheets.

15. A method according to claim 13, wherein the weld seams are joined continuously forming a impermeable airtight barrier.

16. A method according to claim 13, wherein the electric arc is applied by gas metal arc welding in two applications, a first application to tack the plurality of welding members to the plurality of nonferrous metal sheets and the plurality of beams, and a second application to form the weld seam.

17. A method according to claim 13, wherein the plurality of nonferrous metal sheets is a plurality of aluminum sheets, and the weld seams are joined continuously forming a impermeable airtight barrier.

18. A method according to claim 13, wherein each of the plurality of nonferrous metal sheets is less than 0.08 inches thick, and the weld seams are joined continuously forming a impermeable airtight barrier.

19. A method according to claim 13, wherein the plurality of nonferrous metal sheets is a plurality of aluminum sheets, and the electric arc is applied by gas metal arc welding in two applications, a first application to tack the plurality of welding members to the plurality of aluminum sheets and the plurality of beams, and a second application to form the weld seam, where the weld seams are joined continuously forming a impermeable airtight barrier.

20. A method according to claim 13, wherein the plurality of nonferrous metal sheets is a plurality of aluminum sheets, each of the plurality of aluminum sheets is less than 0.08 inches thick, and the electric arc is applied by gas metal arc welding in two applications, a first application to tack the plurality of welding members to the plurality of aluminum sheets and the plurality of beams, and a second application to form the weld seam, where the weld seams are joined continuously forming a impermeable airtight barrier.

* * * * *